(12) United States Patent
Zanella et al.

(10) Patent No.: US 7,076,951 B2
(45) Date of Patent: Jul. 18, 2006

(54) DISCRETE STEP ROTARY ACTUATOR

(75) Inventors: Alessandro Zanella, Turin (IT); Francesco Butera, Turin (IT); Stefano Alacqua, Rivoli Cascine (IT)

(73) Assignee: C.R.F. Societa Consortile per Azioni, Turin (IT)

(*) Notice: Subject to any disclaimer, the term of this patent is extended or adjusted under 35 U.S.C. 154(b) by 0 days.

(21) Appl. No.: 10/523,249

(22) PCT Filed: Feb. 23, 2004

(86) PCT No.: PCT/IB2004/000648

§ 371 (c)(1),
(2), (4) Date: Jan. 27, 2005

(87) PCT Pub. No.: WO2004/082108

PCT Pub. Date: Sep. 23, 2004

(65) Prior Publication Data
US 2006/0037315 A1 Feb. 23, 2006

(30) Foreign Application Priority Data
Mar. 14, 2003 (IT) .................. TO2003A0196

(51) Int. Cl.
F01B 29/10 (2006.01)
(52) U.S. Cl. ........................... 60/527; 60/528
(58) Field of Classification Search ............ 60/527, 60/528, 529
See application file for complete search history.

(56) References Cited

U.S. PATENT DOCUMENTS

| | | | | |
|---|---|---|---|---|
| 1,607,505 A | * | 11/1926 | Bentley | 123/226 |
| 1,952,197 A | * | 3/1934 | Davis | 415/185 |
| 5,018,874 A | | 5/1991 | Weynant nee Girones | |
| 5,543,678 A | | 8/1996 | Hoiberg | |
| 5,955,801 A | | 9/1999 | Romero et al. | |
| 6,242,841 B1 | * | 6/2001 | Williams | 310/306 |
| 6,429,573 B1 | * | 8/2002 | Koopmann et al. | 310/328 |
| 6,530,217 B1 | * | 3/2003 | Yokota et al. | 60/326 |

FOREIGN PATENT DOCUMENTS

DE 196 19 115 A 11/1997

* cited by examiner

Primary Examiner—Hoang Nguyen
(74) Attorney, Agent, or Firm—Sughrue Mion, PLLC

(57) ABSTRACT

A discrete step rotary actuator (1) comprises a stator (2), a rotor (3) and at least an actuating element (10) made with a shape memory active material, the actuating element (10) having a first portion (11) anchored to said stator and a second portion with a terminal element (12). The rotor has a sequence of seatings (14) arranged as a circumference, into which the terminal element (12) can engage in a sequential way. Elastic means (13) placed between the actuating element (10) and the stator (2) induce the shift of the terminal element (12) between two consecutive seatings (14), during the passage of the active material from its shortened to its extended configuration. The passage of the active material from the extended configuration to its shortened configuration imparts the rotor (3) a rotation couple with respect to the stator (2).

21 Claims, 2 Drawing Sheets

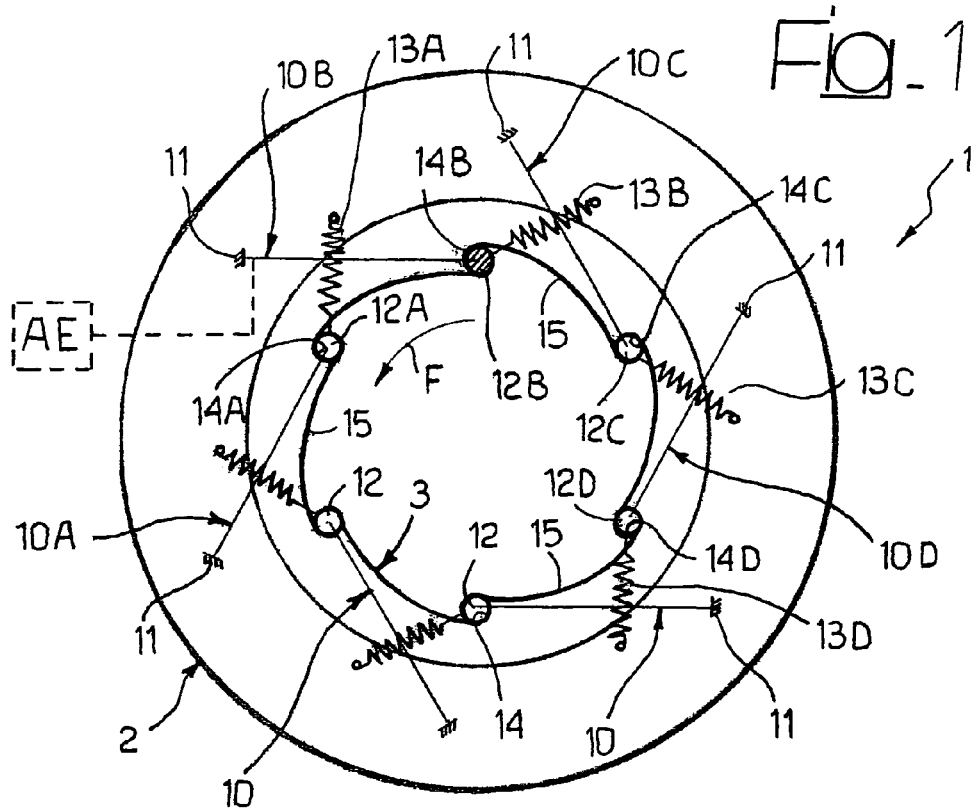
Fig_1
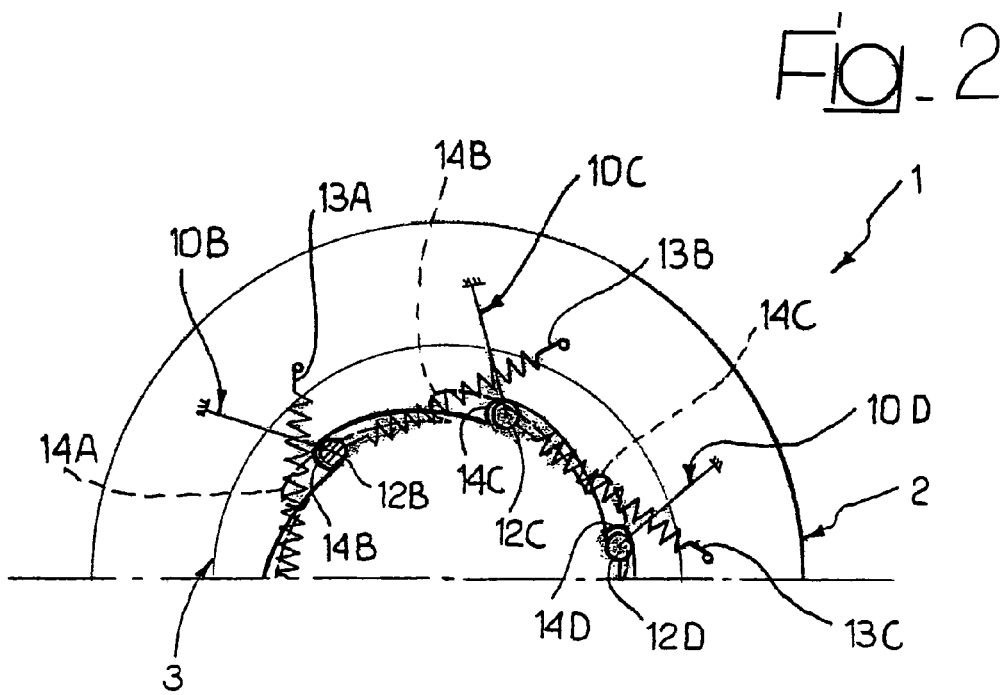
Fig_2

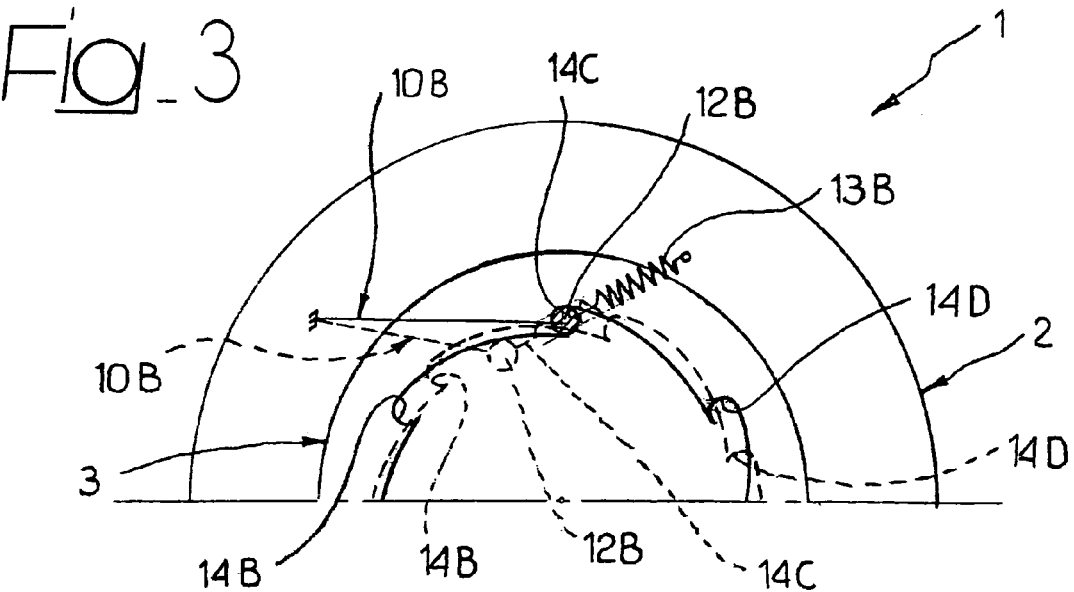
Fig_3
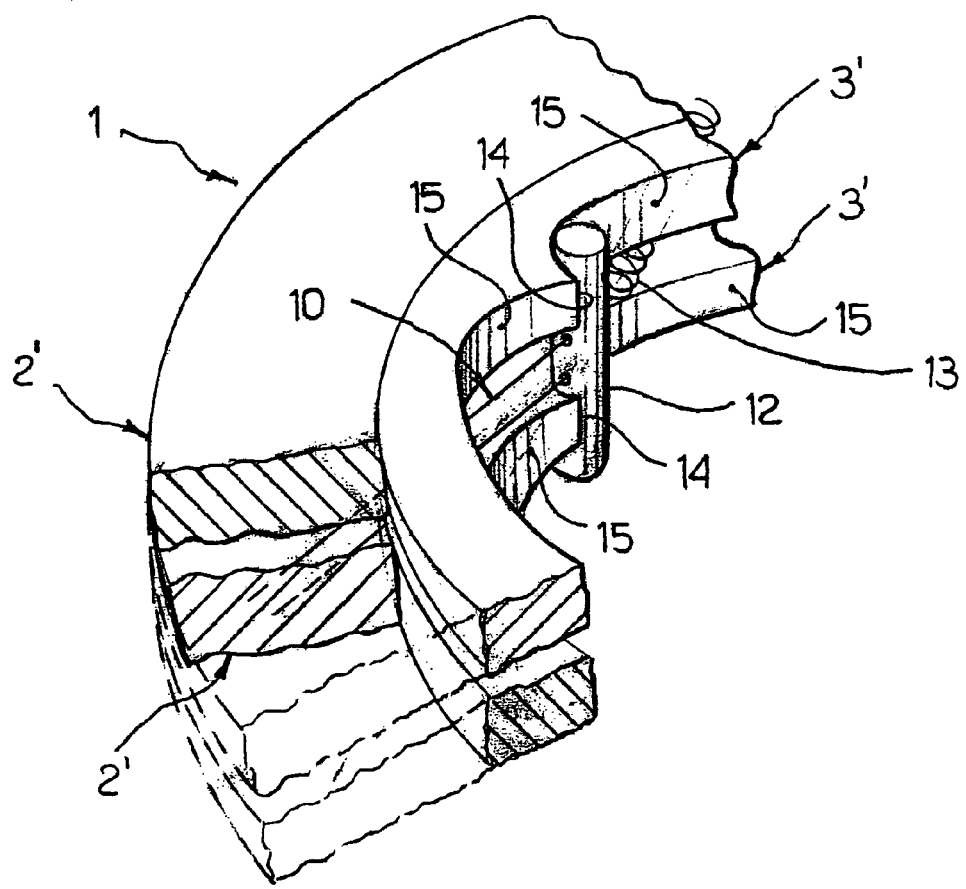
Fig_4

DISCRETE STEP ROTARY ACTUATOR

This is a National Stage entry of Application PCT/IB2004/000648, with an international filing date of Feb. 23, 2004, which was published under PCT Article 21(2) as WO 2004/082108 A1, and the complete disclosure of which is incorporated into this application by reference.

BACKGROUND OF THE INVENTION

The present invention relates to a discrete step rotary actuator, comprising a stationary portion or stator, a rotary portion or rotor and means for rotating the rotor with respect to the stator.

Electric actuators of the type referred to, also known as step-by-step motors or steppers, are used in applications requiring an accurate angular shift of the rotor.

The operation of such actuators or motors, usually with a permanent magnets, with variable reluctance or of hybrid type, provides that a series of current pulses, according to a given sequence, is sent to the actuator, so as to shift the rotor by consecutive jogs, until a balance position is obtained. It is thus possible to rotate a shaft associated with the rotor in the desired position and at the desired speed, by simply counting pulsing and setting their frequency, since the balance positions of shaft and rotor are determined mechanically with a high accuracy.

Known step-by-step actuators are usually bulky and require complex electronic driving circuits, generally digital circuits. The typical jogging operation of said actuators further results in vibrations and noise, above all at low speeds and when simpler driving techniques are used.

SUMMARY OF THE INVENTION

The present invention aims at carrying out a new discrete step rotary actuator having a small size, a high power in relation to size, a noiseless operation and not requiring complex control systems or mechanical reducers.

In view of achieving said aim, the object of the invention is a discrete step rotary actuator as specified above, characterized in that the means for rotating the rotor with respect to the stator comprise:
- at least an actuating element made at least partly with a shape memory active material, which can take a shortened configuration and an extended configuration, the actuating element having a first portion anchored to one of said stator or rotor,
- a sequence of seatings arranged as a circumference around the other one of said rotor or stator, the actuating element having a second portion that can engage said seatings sequentially,
- elastic means placed between the actuating element and the one of said stator or rotor to which said first portion of the actuating element is anchored.

Said elastic means are operative for inducing a shift of said second portion of the actuating element between two consecutive seatings of said sequence, during the passage of the active material from its shortened to its extended configuration, whereas the passage of the active material from the extended configuration to its shortened configuration imparts the rotor a rotation couple with respect to the stator.

In a preferred embodiment, the active material used is a shape memory metal alloy. Actuators made of a shape memory alloy or SMA are known per se and have already been used for several applications in various technical fields. They generally use at least an element made of a metal alloy that can change its structure beyond a given transition temperature. In other possible embodiments, the active material used to make the actuating means of the actuator according to the invention can be a shape memory polymer or SMP or an electro-active polymer or EAP.

The actuating element or elements provided for are preferably thread-shaped and can be connected to electric supply means, which heat up said elements by Joule effect above the transition temperature of the active material. In case of several actuating elements, the latter can be supplied simultaneously or sequentially; several groups of actuating elements can also be supplied sequentially.

Alternatively, the actuating element or elements are driven directly by means of the temperature of a fluid in which the actuator is operating, for instance a gas or a liquid.

Thanks to the characteristics referred to above, the actuator according to the invention has a simple structure, a small size and a low cost, while its operation is accurate, noiseless and can be easily controlled.

BRIEF DESCRIPTION OF THE DRAWINGS

Further characteristics and advantages of the invention will be evident from the following description referring to the accompanying drawings, provided as mere non-limiting examples, in which:

FIG. 1 is a schematic view in elevation of a rotary actuator according to the invention, in a first operating condition;

FIG. 2 is schematic view in elevation of a portion of the rotary actuator of FIG. 1, in a second operating condition;

FIG. 3 is a schematic view resembling the one in FIG. 2, with the rotary actuator in a third operating condition;

FIG. 4 is a perspective view, partially sectioned, of a portion of the rotary actuator according to a possible embodiment of the invention.

DETAILED DESCRIPTION OF THE INVENTION

In the figures number 1 globally refers to a rotary actuator according to the invention, which comprises a stationary portion or stator, referred to with number 2, and a rotary portion or rotor, referred to with number 3. Note that in FIG. 1, as well as in the following FIGS. 2 and 3, some of the components of the actuator are referred to with the numbers mentioned below plus letters A, B, C and D, so as to better show their positioning variations; in the following description, however, only numbers will be mentioned.

The stator 2 has a central housing with a circular section, for instance shaped as a through cavity, within which the rotor 3 is turnably mounted; in the case shown by way of example, the stator 2 and the rotor 3 have a basically cylindrical hollow shape and are coaxial one to the other, the outer circular surface of the rotor 3 being adjacent to the inner circular surface of the stator 2. By way of example, the stator 2 can have an outer diameter of 15–20 mm and a thickness of 2–3 mm.

According to the invention, in order to generate a rotation couple between the rotor 3 and the stator 2, one or more actuating elements are provided for, referred to with number 10, at least partly made of an active material, i.e. a material whose structure can be selectively modified by applying a stimulus from outside.

In the preferred embodiment of the invention, the active material used is a shape memory metal alloy. As previously mentioned, such metal materials can recover their initial configuration if deformed and then undergoing a suitable heat treatment. In particular, shape memory metal alloys undergo a crystalline phase modification when going from their stiffest configuration at high temperature (austenite) to their configuration at lower energy and temperature (martensite). When brought to a low temperature, an element made of a shape memory alloy takes a martensite-like structure, with a low yield point, and is easily deformable; after heating the alloy takes another crystalline structure, austenite-like, and then recovers its initial structure and shape. The transition temperature, starting from which the alloy "remembers" its primitive shape, can be changed by varying the composition or by suitable heat treatments. The most interesting alloys with "shape memory" properties are those with a considerable deformation recovery or generating a remarkable strength during phase transition, such as Ni—Ti, Ni—Ti—Cu, Cu—Al—Zn, Cu—Al—Ni alloys, which can be used to implement the invention.

In the case shown by way of example in FIG. 1, the actuator 1 comprises six actuating elements 10 shaped like a thread or in any case having a thin and oblong shape, all of the same length; by way of example, said threads 10 can have a length of about 3–5 mm.

Each thread 10 is anchored on one side to the stator 2, in a corresponding area referred to with 11; on the opposite side, each thread 10 is associated with a terminal element 12, not necessarily made of an active material. Each terminal element 12 is fastened to the first end of a corresponding coil spring 13, the other end being anchored to the stator 3. Said springs 13 are arranged so as to exert a traction onto the corresponding terminal elements 12 in a direction substantially opposite the one of the anchoring point 11 of the respective thread 10, with reference to the direction of rotation of the rotor, referred to with F in FIG. 1.

As can be seen in FIG. 4, both the rotor and the stator can consist each of two coaxial discs 2', 3', made integral one to the other through means known per se; thus, a space between the discs 2' and the discs 3' is defined, through which extend the threads 10 and the springs 13. FIG. 4 also shows how the threads 10 can be U-shaped, with a going and a return portion with respect to the terminal element 12, so that both ends of the thread are close to one another, thus making the electric and mechanical connection in the corresponding area 11 easier.

The inner peripheral surface of the rotor 3 is provided with equidistant engagement seatings 14 for terminal elements 12; in the case shown by way of example, and as can be seen in FIG. 4, the terminal elements 12 are shaped like small cylinders and their engagement seatings have a substantially concave shape, open in the direction opposite the direction F of rotation of the rotor 3.

The inner peripheral surface of the rotor 3 is shaped so as to define, between two consecutive seatings 14, a slope 15 or "sky-jump", i.e. a surface with a slightly curved development, which joins two plans located at different heights; in particular, each slope 15 has a development ascending from a seating 14 to the following one, with reference to the direction opposite the direction F of movement of the rotor 3. As for the threads 10 and the springs 13, in the case shown by way of example, there are six seatings 14 and six slopes 15.

In the preferred embodiment of the invention, the ends of the threads 10 are connected to an electric supply source, schematically referred to with AE in FIG. 1, so as to let an electric current go through said threads and then heat the latter by Joule effect. Depending on the control pattern chosen for the actuator 1, the threads 10 can be supplied simultaneously or sequentially. The actuator 1 works as described in the following with reference to the case of simultaneous supply of all threads 10.

FIG. 1 shows a rest condition of the actuator 1, in which the threads 10 are not supplied; as can be seen, in said condition the terminal elements 12 are arranged each in a respective engagement seating 14 of the rotor 3.

As a consequence of the heating due to the passage of electric current, the threads 10 get over their transition temperature and take a shortened or a small length configuration, as can be seen in FIG. 2, thus pulling the terminal elements 12 towards their respective anchoring areas 11.

When passing from their extended to their shortened configuration, the threads 10 thus impart the rotor 3 a rotation couple, which results in the passage of said rotor from the position indicated with a hatched line to the one indicated with the full line in FIG. 2. It is thus possible to obtain a discrete angular movement of the rotor 3 with respect to the stator 2.

After reaching the position of FIG. 2, the electric supply to the threads 10 is interrupted; thus, their temperature decreases progressively and sinks below the transition temperature of the shape memory alloy, so that said threads take back their respective extended configurations.

The passage from the shortened to the extended configurations (as is indicated with a hatched line in FIG. 3, only for thread 10B and its respective terminal elements 12B and spring 13B) is helped by the action of the springs 13, which "pull" the terminal elements 12 and make them slide on the slopes 15, until said elements engage into a seating 14 following the one they previously occupied.

Thus the operating position indicated with a full line in FIG. 3 is reached, in which each terminal element 12 engages a seating 14 following the one previously occupied; the position of the seatings 14 indicated with a hatched line in FIG. 3 corresponds to the position of FIG. 1.

Then the threads 10 will be supplied again, thus obtaining a new discrete angular movement of the rotor 3 with respect to the stator 2, and then current supply will be interrupted again. The operating cycle is repeated until the desired actuation is obtained.

The shape memory material used for the actuating elements 10 according to the present invention could be a non-metallic material, and in particular a shape memory polymer or SMP. As is generally known, such polymers can modify their stiffness and shape depending on the temperature they are subject to and swiftly pass, if heated, from a glass-like state to a highly deformable rubber-like state, then going back as swiftly as before, when cooled, to their original shape and hardness. Moreover, similarly to metal alloys, thanks to their "memory", SMPs can recover for an endless number of times their original shape, if brought again beyond their critical temperature.

If the threads 10 are made of a shape memory polymer, the supply cycle of said threads will be opposite with respect to the one described before, i.e. with a current supply so as to obtain the passage of said threads from their shortened to their extended condition and, conversely, an interruption of current supply so as to let them pass from their extended to their shortened structure; in this application, therefore, the rotation couple will be imparted to the rotor 3 when the threads 10 pass from their extended to their shortened configuration, and thus during a step in which said threads are not supplied with electricity.

In a further possible embodiment, the shape memory material used at least for a portion of each actuating element 12 could be an electro-active polymer or EAP, i.e. a polymer material that can undergo deformations if an electric field is applied to it, chosen in particular among:

electrostrictive polymers, i.e. polymers that, when subject to electric fields, react by reducing the size parallel to the field and increasing the size orthogonal to said field;

IPMC polymers (ion polymer metal composites), i.e. metal-ion composite polymers whose terminations can ionize into polar liquids (one among the most used IMPCs is NAFION® by DuPont, used as "artificial muscle");

conductive polymers, i.e. polymers that change, when ionization varies, their mechanical properties and size and can therefore be used with great advantages both as sensitive elements and as mechanical actuators.

The invention enables to carry out discrete step actuators with miniaturized size and high power density, which do not require reducers or complex control systems and which are noiseless and accurate. In said light, the applications of the actuator 1 are manifold; in particular, it should be pointed out that the invention can be used with great advantages in the field of micro electromechanical systems or MEMS, for making miniaturized devices such as motors, pumps, turbines, shutters, flow deflectors, etc.

It should be pointed out that, if the sequence rapidity of the discrete actuating steps should be privileged, the threads 10 could be supplied in a sequential or phase-shifted way one with respect to the other, and not simultaneously. Obviously, in such a case, if on one side the couple imparted to the rotor 3 is smaller, on the other side cycle time can be reduced.

It is also evident that both suggested control techniques can be advantageously combined, for instance by supplying sequentially pairs or triplets of threads 10, so as to obtain a desired couple and a desired actuating speed. In said light, it is also evident that the number of threads 10 can vary with respect to the number (six) previously mentioned by way of example; for instance there could be sixteen threads 10, supplied sequentially four by four.

In a possible embodiment, the threads 10 could act by detecting directly the temperature to which they are subject, for instance the temperature of a gas or a liquid, so as to be actuated by said temperature at a transition value that can be adjusted when preparing the active material used; in said light, for instance, the actuator 1 could be designed to control a shutter and be directly immersed in a liquid to be controlled. When said liquid passes from a first to a second given temperature, the threads pass from their extended to their shortened configuration (or conversely, depending on the active material used), and then go back to their initial condition when the liquid goes back to the first temperature, so as to obtain automatically an actuating step of the rotor 3. In said application, the threads 10 could also be single-length threads, i.e. not U-shaped, and thus with an end anchored to the corresponding area 11 and the other end associated with the corresponding terminal element 12.

Obviously, though the basic idea of the invention remains the same, construction details and embodiments can widely vary with respect to what has been described and shown by mere way of example, however without leaving the framework of the present invention.

The functions of the stator 2 could be performed by any structure having a stationary position with respect to the rotor 3.

The functions of the components referred to with numbers 2 and 3 could be inverted with respect to those previously mentioned by way of example, for instance with the component 3 in stationary position, acting as a stator, and the component 2 making angular movement, acting as a rotor.

It is then obvious to the person skilled in the art that in a possible embodiment with the stator in central position and the rotor in peripheral position, the engagement seatings 14 and the slopes 15 could be defined on the outer peripheral surface of the rotor.

The actuator previously described can rotate only in one direction but, as was said, can have an extremely small size (basically like a coin). In said light, an actuator according to the invention can be made so as to be piled up onto another actuator of the same type, though oriented with opposite direction of rotation. Thus, by coupling two actuators, one for each direction of rotation, it is possible to obtain a compact device, that can be actuated in both directions of rotation.

What is claimed is:

1. Discrete step rotary actuator (1), comprising a stationary part or stator (2), a rotary part or rotor (3) and means (10, 13, 14) for rotating the rotor (3) with respect to the stator (2), characterized in that said means (10, 13, 14) comprise at least an actuating element (10) made at least partly with a shape memory active material, which can take a shortened configuration and an extended configuration, the actuating element (10) having a first portion (11) anchored to one of said stator (2) and rotor (3), a consecutive sequence of consecutive seatings (14) arranged as a circumference around the other one of said rotor (3) and stator (2), the actuating element (10) having a second portion (12) that can engage said seatings (14) sequentially, elastic means (13) placed between the actuating element (10) and the one of said stator (2) and rotor (3) to which said first portion (11) of the actuating element (10) is anchored, where said elastic means (13) are operative for inducing a shift of said second portion (12) of the actuating element (10) between two consecutive seatings (14) of said sequence, during the passage of the active material from its shortened to its extended configuration, the passage of the active material from the extended configuration to its shortened configuration imparting the rotor (3) a rotation couple with respect to the stator (2).

2. Actuator according to claim 1, characterized in that said active material is selected in the group consisting of shape memory metal alloys, shape memory polymers, electro-active polymers.

3. Actuator according to claim 1, characterized in that said actuating element (10) can be subject to an electric or heat stimulus so as to obtain its passage from its shortened to its extended configuration, or vice-versa.

4. Actuator according to claim 3, characterized in that said actuating element (10) is connected to electric supply means (AE), which are operative for heating it by Joule effect.

5. Actuator according to claim 3, characterized in that said actuating element (10) is arranged so as to be actuated by the temperature of a fluid to which said element is subject.

6. Actuator according to claim 1, characterized in that said elastic means (13) are operative to induce exert a traction onto the respective actuating element (10), in order to move said second portion (12) away from said first portion (11).

7. Actuator according to claim 6, characterized in that said elastic means comprise a spring (13), particular a coil spring.

8. Actuator according to claim 7, characterized in that said second portion comprises a terminal element (12) with which an end of said spring (13) is associated.

9. Actuator according to claim 1, characterized in that said seatings (14) have a substantially concave shape, whose cavity is open in the direction opposite the direction of angular movement (F) of said rotor (3).

10. Actuator according to claim 1, characterized in that said seatings (14) are substantially at the same distance one from the other and are arranged on a circumferential surface of one of said stator (2) and rotor (3).

11. Actuator according to claim 10, characterized in that said circumferential surface is shaped so as to define, between pairs of subsequent seatings (14) of said sequence, a slope (15) with a descending development with respect to the direction of angular movement (F) of said rotor (3).

12. Actuator according to claim 8, characterized in that said actuating element (10) has a thin and long shape.

13. Actuator according to claim 1, characterized in that said stator (2) and rotor (3) are made up each of a pair of substantially disc-shaped, coaxial and parallel elements (2', 3'), said actuating element (10) and the respective elastic means (13) extending at least partly in a space defined between the two disc-shaped elements (2', 3') of each pair.

14. Actuator according to claim 1, characterized in that it is provided for a plurality of actuating elements (10), each of which is associated with respective elastic means (13).

15. Actuator according to claim 14, characterized in that it is provided for a simultaneous electric supply of a plurality of said actuating elements (10).

16. Actuator according to claim 14, characterized in that said actuating elements (10) are supplied with electric energy in a sequential way.

17. Actuator according to claim 14, characterized in that at least a first plurality of said actuating elements (10) is supplied sequentially with respect to a second plurality of said actuating elements (10).

18. Actuator according to claim 1, characterized in that said stator (2) is in a peripheral position with respect to said rotor (3).

19. Actuator according to claim 1, characterized in that said rotor is in a peripheral position with respect to said stator.

20. Actuator according to claim 10, characterized in that said circumferential surface is an inner or outer peripheral surface of said stator (2) or rotor (3).

21. Method for generating a discrete step rotation of a stationary part or stator (2) with respect to a rotary part or rotor (3), comprising the following steps:

providing out at least an actuating element (10) at least partly made of a shape memory active material which can take a shortened and an extended configuration;

making a consecutive sequence of consecutive seatings (14) arranged on of said stator (2) or rotor (3);

anchoring a first portion (11) of the actuating element (10) to one of said rotor (3) and stator (2), so that a second portion (12) of the actuating element (10) engages a first of said seatings (14)

placing elastic means (13) between the actuating element (10) and the one of said stator (2) or rotor (3) to which the first portion (811) of the actuating element (10) is anchored;

applying an electric or heat stimulus to the active material, so as to determine the passage from said shortened said extended configuration, vice versa;

where the passage of the active material from its extended to its shortened configuration imparts the rotor (3) a rotation couple with respect to the stator (2) contrasting the action of said elastic means (13), and the latter induce a shift of said second portion (12) from said first seating to a following consecutive seating (14) of said sequence, during the passage of the active material from said shortened to said extended configuration.

* * * * *